Dec. 1, 1970  I. A. HUNT  3,543,344
MOULDING PRESS
Filed Feb. 5, 1968  3 Sheets-Sheet 1
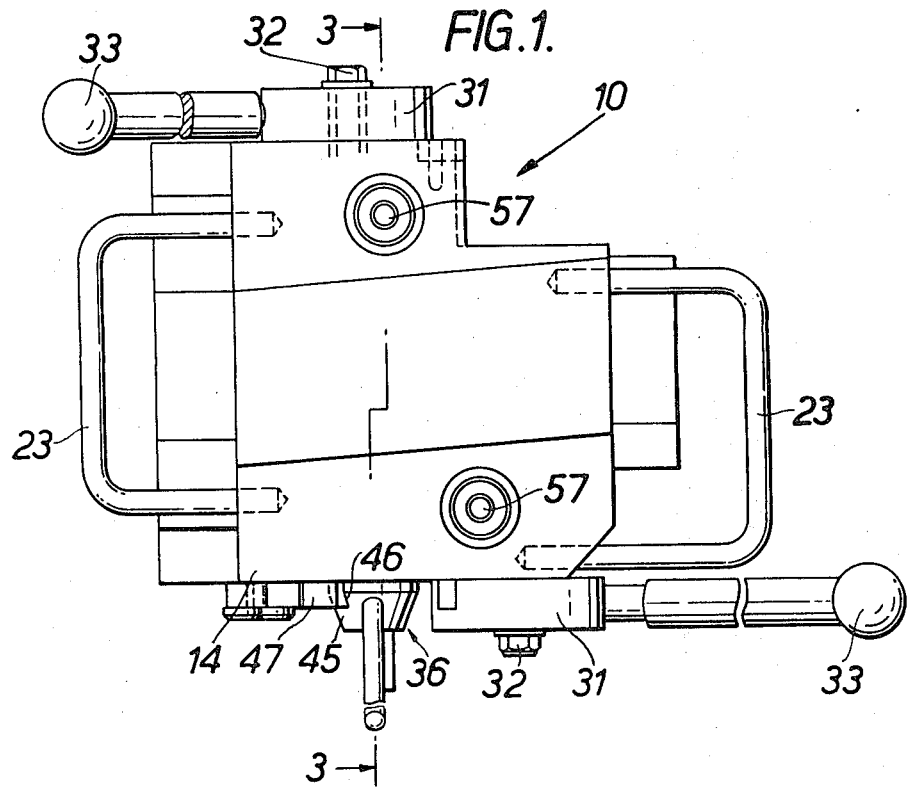
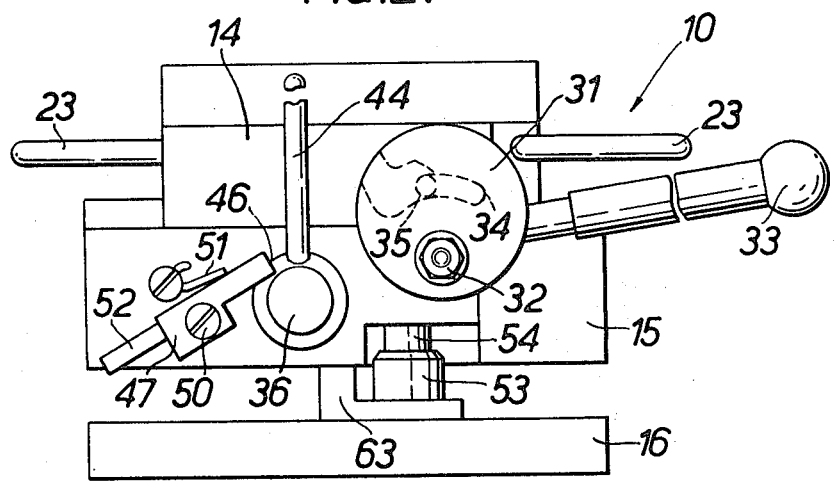
Inventor
Ian Arthur Hunt
By Cushman, Darby & Cushman
Attorneys

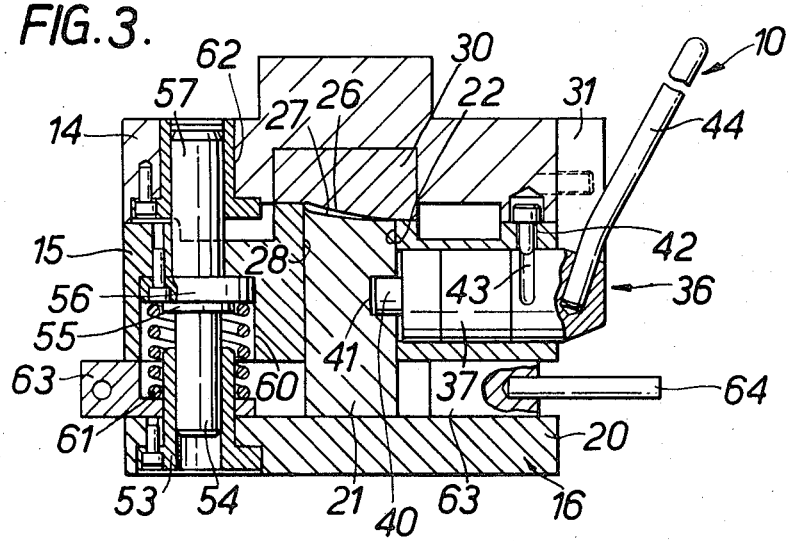
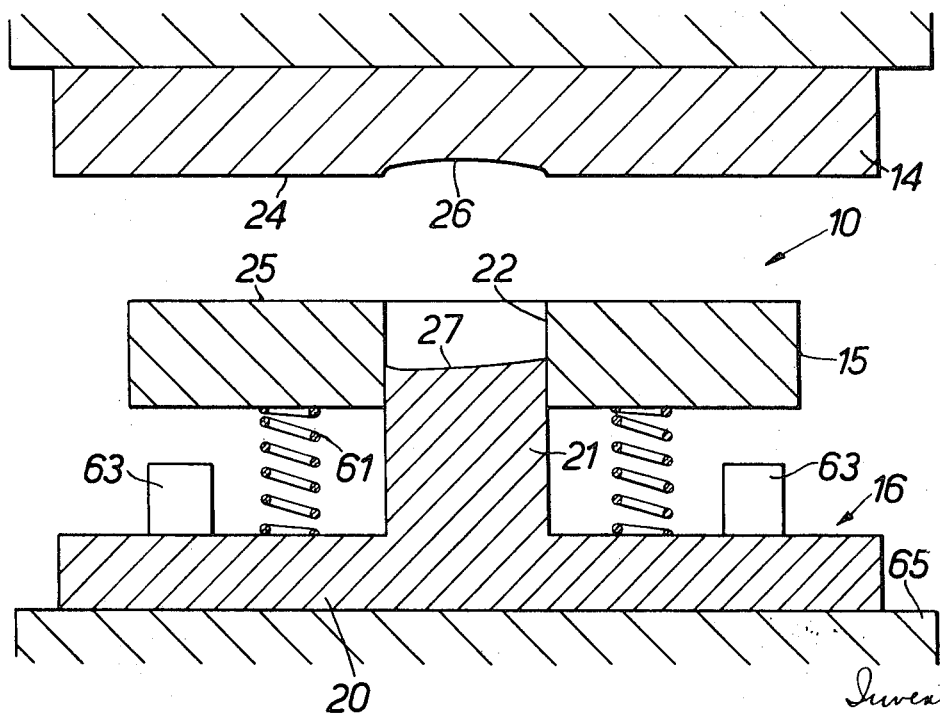

Dec. 1, 1970   I. A. HUNT   3,543,344
MOULDING PRESS
Filed Feb. 5, 1968   3 Sheets-Sheet 3
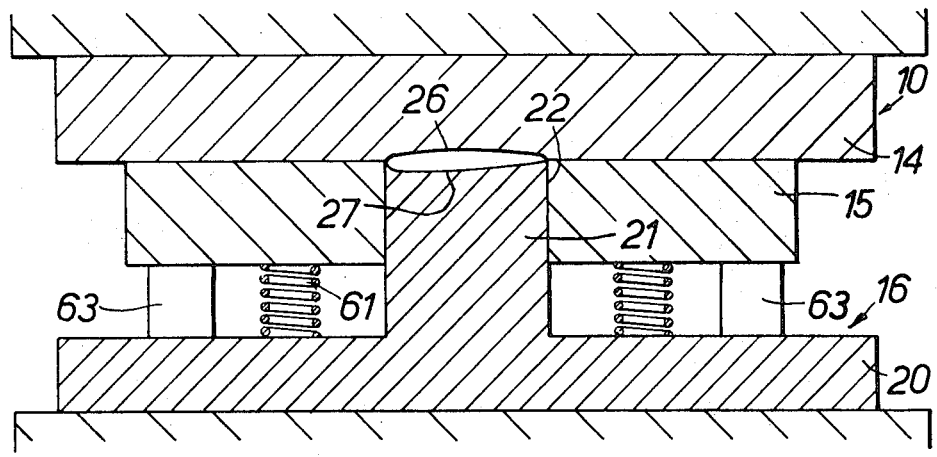
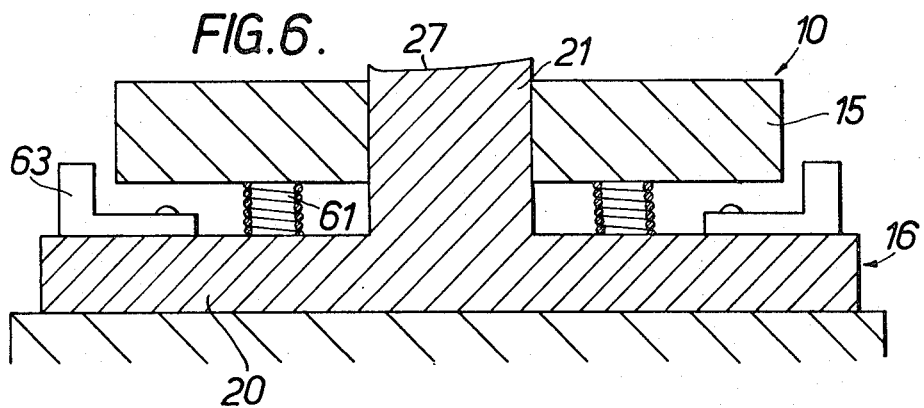
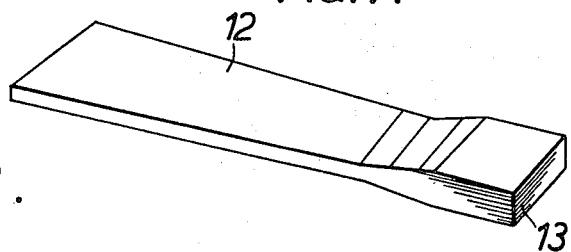
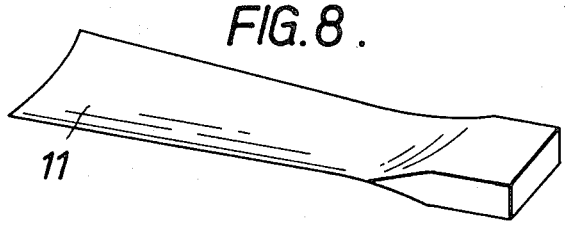
Inventor
Ian Arthur Hunt
By Cushman, Darby & Cushman
Attorneys United States Patent Office 3,543,344
Patented Dec. 1, 1970

3,543,344
MOULDING PRESS
Ian Arthur Hunt, Derby, Derbyshire, England, assignor to Rolls-Royce Limited, Derby, Derbyshire, England, a British company
Filed Feb. 5, 1968, Ser. No. 703,035
Claims priority, application Great Britain, Feb. 22, 1967, 8,588/67
Int. Cl. B30b 1/06
U.S. Cl. 18—16                                                    7 Claims

ABSTRACT OF THE DISCLOSURE

An article, such as a fibre-reinforced synthetic resin, aerofoil-shaped blade is moulded by positioning first, second and third members so that a moulding surface on a portion of the first member is within an aperture in the second member and engageable surfaces on the second and third members are separated, placing an article or material to be moulded in said aperture and between moulding surfaces on the said portion and the third member, clamping the second and third members together with their engageable surfaces in engagement, bringing the moulding surfaces together and effecting moulding of the said article or material, separating the second and third members, effecting relative sliding movement of the said portion in the said aperture to bring the moulding surface on the said portion outwardly of said aperture, and removing the moulded article.

This invention concerns improvements relating to moulding.

According to one aspect of the present invention, there is provided moulding apparatus comprising first, second and third members all of which are relatively movable along a common axis towards and away from each other, the first member having a portion which is a sliding fit in an aperture in the second member, the second and third members having engageable surfaces, the said portion and the third member being respectively provided with moulding surfaces between which an article or material to be moulded may be introduced when the said engageable surfaces are separated, means for clamping the second and third members together, with their said engageable surfaces in engagement, while maintaining the moulding surface on the said portion within the said aperture and spaced from the moulding surface on the third member, means for permitting or causing the moulding surfaces to be brought together while the second and third members are clamped together, and means, operable after the second and third members have been separated, for effecting relative sliding movement of the said portion in the said aperture to bring the moulding surface on said portion outwardly of said aperture, whereby to assist removal of the moulded article.

The moulding surfaces are preferably brought together by axial movement of the clamped together second and third members towards the first member.

Movable stops are preferably provided which are movable between a first position, in which they prevent the said axial movement of the clamped together second and third members being continued beyond the position in which the moulding surfaces are brought together, and a second position in which the second member, after being separated from the third member, may be moved axially towards the first member to bring the moulding surface on said portion outwardly of said aperture.

The first and second members are preferably interconnected by a mechanism by means of which the second member may be moved axially towards and away from the first member.

Releasable detent means may be provided which, until released, prevent the said mechanism from being moved to bring the moulding surface on the said portion outwardly of the said aperture.

The said mechanism may comprise a rotary member having relatively eccentric parts which are respectively mounted in the said portion and in the second member, means being provided for rotating the said rotary member.

The means for clamping the second and third members together may comprise pegs on one of said members which are received in cam grooves in rotatable parts mounted on the other of said members.

The first, second and third members are preferably respectively provided with interengageable locating devices.

The moulded article may be a fibre reinforced synthetic resin aerofoil-shaped blade. Thus the article placed in the aperture may be a blade blank made up of a number of shaped fibre-reinforced synthetic resin sheets.

The invention is illustrated, merely by way of example, in the accompanying drawings, in which:

FIG. 1 is a plan view of moulding apparatus according to the present invention,

FIG. 2 is an elevation of the moulding apparatus of FIG. 1,

FIG. 3 is a cross section taken on the line 3—3 of FIG. 1,

FIGS. 4 to 6 are purely diagrammatic sectional views illustrating the moulding apparatus of FIGS. 1 to 3 with the parts thereof in various relative locations, FIG. 7 is a perspective view of a gas turbine engine blade blank which may be moulded to shape in the said moulding apparatus, and FIG. 8 is a perspective view of a gas turbine engine blade which has been formed from the blank of FIG. 7.

In FIGS. 1 to 6 there is shown a moulding apparatus 10 which may be employed inter alia, to produce a moulded fibre-reinforced synthetic resin aerofoil-shaped blade 11 as shown in FIG. 8, the blade 11 being a gas turbine engine compressor blade. The blade 11 is moulded from a blade blank 12 (FIG. 7), which is made up of a number of shaped fibre-reinforced synthetic resin sheets 13. The sheets 13 may be assembled to form the blank 12 either manually or otherwise.

The moulding apparatus 10 for moulding the blade 11 comprises an upper member 14, a middle member 15 and a lower member 16. The lower member 16 comprises a base plate 20 and a column 21 upstanding from the centre thereof. The lower member 16 is a fixed member, the middle member 15 being a movable member which is movable axially towards and away from the lower member 16. For this purpose, the middle member 15 has an aperture 22 (best seen in FIG. 4), the column 21 being a sliding fit in the aperture 22.

The upper member 14 is relatively movable axially with respect to the middle member 15 and indeed may be totally separated therefrom by the use of a pair of handles 23 (FIGS. 1 and 2).

The upper member 14 and the middle member 15 are respectively provided with engageable surfaces 24, 25 (see FIG. 4). The column 21 and the upper member 14 are respectively provided with moulding surfaces 26, 27, between which the blade blank 12 may be introduced when the engageable surfaces 24, 25 are separated as shown in FIG. 4. The moulding surfaces 26, 27 have shapes corresponding to those to be given to the blade. As shown in FIG. 3, the surface 26 is provided on an insert 30 mounted in the upper member 14, while the column 21 is provided, adjacent the top thereof, with a peripheral groove 28 so as to receive any flash which may be squeezed from the blade when the blade is under pressure.

Mounted on opposite sides of the moulding apparatus 10, and disposed out of alignment with each other, are rotatable discs 31 (best seen in FIG. 2). Each of the discs 31 is mounted on a pivot 32 which is itself mounted in the middle member 15, each disc 31 being rotatable, by means of a handle 33. Each of the discs 31 has a cam groove 34 therein in which is mounted a peg 35 which is secured to the upper member 14. Thus, when the handles 33 are turned counterclockwise, as seen in FIG. 2, the members 14, 15 are clamped to each other whilst when the handles 33 are turned clockwise, as seen in FIG. 2, the upper member 14 may be lifted away from the middle member 15.

The discs 31 permit the middle member 15 to be clamped to the upper member 14 while simultaneously permitting the moulding surface 27 on the column 21 to be disposed within the aperture 22 and spaced from the moulding surface 26 on the upper member 14.

A cam member 36 (best seen in FIG. 3) has a substantially cylindrical portion 37, which is mounted in the middle member 15, and an eccentric portion 40 which is mounted in a recess 41 in the column 21.

Mounted in the middle member 15 is a pin 42 which is received in a part-annular track 43 in the cam member 36. Accordingly, when the cam member 36 is rotated by means of a handle 44, the relative eccentricity of the portion 40 with respect to the portion 37 will cause the middle member 15 to be raised or lowered on the column 21.

The cam member 36, as best seen in FIG. 1, is formed at its outer end 45 with a flat which forms a shoulder 46. The shoulder 46 is engageable by a detent member 47 which is mounted on a pivot 50 (FIG. 2) in the middle member 15. The detent member 47 is urged by a leaf spring 51 towards a position in which it engages the cam member 36. The detent member 47 is, however, provided with an extension 52 which may be depressed manually to move the detent member 47 away from the cam member 36.

Until, however, the detent member 47 has been so released, it prevents the cam member 36 being moved to bring the moulding surface 27 on the column 21 outwardly of the aperture 22, and thus prevents this from occurring accidentally.

Mounted in the base plate 20 are two spaced apart bushes 53 each of which is adapted to receive a dowel 54 (FIG. 3). Each dowel 54 has a disc 55 at its upper end which is mounted beneath and secured to a disc 56 having a dowel 57 upstanding therefrom. Each disc 56 is secured within the middle member 15 and has acting against it a spring 61 which thus urges the middle member 15 axially away from the lower member 16.

Each dowel 57 is received within a bush 62 which is secured within the upper member 14.

The dowels 54, 57 and bushes 53, 62 thus provide the various members 14, 15, 16 with interengageable locating devices.

Pivotally mounted about each of the bushes 53 is a movable stop 63 which is movable by means of a handle 64. Each of the stops 63 is movable between a first position (shown in FIG. 5) in which it limits movement of the middle member 15 towards the lower member 16, and a second position (shown in FIG. 6) in which further movement of the middle member 15 towards the lower member 16 may be effected. In moving between these said positions, the stops 63 are slidable in contact with the lower surface of the middle member 15.

In operation, the parts of the moulding apparatus 10 are first moved to the relative positions indicated in FIG. 4, in which the moulding surface 27 is within the aperture 22, the engageable surfaces 24, 25 are separated and the movable stops 63 are in the said first position. The blade blank 12 of FIG. 7 which is to be moulded to shape is then placed on the moulding surface 27 and within the aperture 22. The blade blank 12 is thus, at this stage, disposed between the moulding surfaces 26, 27 but is not as yet in contact with the surface 26.

The upper member 14 is then clamped to the middle member 15 by engaging the pins 35 in the outer ends of the cam grooves 34 and rotating the discs 31 by the use of the handles 33 in a counterclockwise direction as seen in FIG. 2. This will bring the engageable surfaces 24, 25 into engagement, but at this stage the moulding surface 26 will still be spaced from the moulding surface 27.

The moulding apparatus is then placed on a base 65 of a press and beneath the movable platen 66 of the press. Pressure is then applied to the movable platen 66 so as to force the clamped together members 14, 15 downwardly towards the lower member 16 until the middle member 15 contacts the movable stops 63, the moulding surfaces 26, 27 being thus brought together. This pressure of the members 14, 15 downwardly may of itself produce rotation of the cam member 36, but such rotation will also at this time be effected manually by means of the handle 44, the cam members 36 being rotated until the shoulder 46 engages the detent member 47. The parts will then be in the position shown in FIG. 5, in which the moulding surface 27 contacts the moulding surface 26 and is disposed within, but at the upper end of, the aperture 22.

The pressure is applied for a period of ten minutes and during the whole of this time the mould is kept at a temperature of 185° C.

At the end of this ten-minute period, the pressure is released and the moulding apparatus 10 is removed from the press.

After being removed from the press, the discs 31 are rotated by the handles 33 to enable the upper member 14 to be lifted away by its handles 23. Apart from the upper member 14, however, the remaining parts of the moulding apparatus 10 will at this stage still be in the FIG. 5 position.

In order, however, to assist removal of the moulded blade 11, the movable stops 63 are moved to the position shown in FIG. 6, the extension 52 of the detent member 47 is depressed, and the cam member 36 is rotated by its handle 44 to lower the middle member 15 towards the base plate 20, whereby the moulding surface 27 on the column 21 is moved outwardly of the aperture 22. The moulded blade may now be easily removed, its removal, if necessary, being assisted by a puff of compressed air. The moulded blade is then transferred to an oven (not shown) for the final curing of the blade.

As will be appreciated, the construction shown in the drawings permits the moulded blade 11 to be moved away from the surface 27 without being gripped by its edges.

If desired, instead of providing a cam member 36 to move the middle member 15 towards and away from the lower member 16, a gear wheel (not shown) may be employed which meshes with two racks (not shown) on the column 21 and on the middle member 15, respectively. In this case, the lower member 16 is a movable member rotation of the said gear wheel about a fixed axis causing simultaneous approaching or separating movement of the column 21 and middle member 15.

If the upper member 14 is heavy, pneumatic or hydraulic rams (not shown) may be provided to lift it.

I claim:
1. Moulding apparatus comprising first, second and third members all of which are relatively movable along a common axis towards and away from each other, the second member having an aperture therein and the first member having a portion which is a sliding fit in the aperture, the second and third members having engageable surfaces, the said portion and the third member being re- spectively provided with moulding surfaces between which an article or material to be moulded may be introduced when the said engageable surfaces are separated, means for clamping the second and third members together with their said engageable surfaces in engagement while maintaining the moulding surface on the said portion within the said aperture and spaced from the moulding surface on the third member, means for permitting or causing the moulding surfaces to be brought together while the second and third members are clamped together latterly movable stop means movable between a first position, in which they prevent the said axial movement of the clamped together second and third members being continued beyond the position in which the moulding surfaces are brought together, and a second position latterly displaced from the first position in which the second member, after being separated from the third member, may be moved axially towards the first member to bring the moulding surface on said portion outwardly of said aperture for ejection of the moulded article, and means, operable after the second and third members have been separated, for effecting relative sliding movement of the said portion in the said aperture to bring the moulding surface on said portion outwardly of said aperture, whereby to assist removal of the moulded article.

2. Moulding apparatus as claimed in claim 1 in which the moulding surfaces are brought together by axial movement of the clamped together second and third members toward the first member.

3. Moulding apparatus as claimed in claim 2 in which the first and second members are interconnected by a mechanism by means of which the second member may be moved axially towards and away from the first member.

4. Moulding apparatus as claimed in claim 1 in which the first, second and third members are respectively provided with interengageable locating devices.

5. Moulding apparatus comprising first, second and third members all of which are relatively movable along a common axis towards and away from each other, the second member having an aperture therein and the first member having a portion which is a sliding fit in the aperture, the second and third members having engageable surfaces, the said portion and the third member being respectively provided with moulding surfaces between which an article or material to be moulded may be introduced when the said engageable surfaces are separated, means for clamping the second and third members together with their said engageable surfaces in engagement while maintaining the moulding surface on the said portion within the said aperture and spaced from the moulding surface on the third member, said means for clamping the second and third members together comprising pegs on one of said members which are received in cam grooves in rotatable parts mounted on the other of said members, means for permitting or causing the moulding surfaces to be brought together while the second and third members are clamped together, and means, operable after the second and third members have been separated, for effecting relative sliding movement of the said portion in the said aperture to bring the moulding surface on said portion outwardly of said aperture, whereby to assist removal of the moulded article.

6. Moulding apparatus comprising first, second and third members all of which are relatively movable along a common axis towards and away from each other, the second member having an aperture therein and the first member having a portion which is a sliding fit in the aperture, the second and third members having engageable surfaces, the said portion and the third member being respectively provided with moulding surfaces between which an article or material to be moulded may be introduced when the said engageable surfaces are separated, means for clamping the second and third members together with their said engageable surfaces in engagement while maintaining the moulding surface on the said portion within the said aperture and spaced from the moulding surface on the third member, means for permitting or causing the moulding surfaces to be brought together while the second and third members are clamped together, said first and second members being interconnected by a mechanism by means of which the second member may be moved axially towards and away from the first member, releasable detent means provided which, until released, prevent the said mechanism from being moved to bring the moulding surface on the said portion outwardly of said aperture, and means, operable after the second and third members have been separated, for effecting relative sliding movement of the said portion in the said aperture to bring the moulding surface on said portion outwardly of said aperture, whereby to assist removal of the moulded article.

7. Moulding apparatus comprising first, second and third members all of which are relatively movable along a common axis towards and away from each other, the second member having an aperture therein and the first member having a portion which is a sliding fit in the aperture, the second and third members having engageable surfaces, the said portion and the third member being respectively provided with moulding surfaces between which an article or material to be moulded may be introduced when the said engageable surfaces are separated, means for clamping the second and third members together with their said engageable surfaces in engagement while maintaining the moulding surface on the said portion within the said aperture and spaced from the moulding surface on the third member, means for permitting or causing the moulding surfaces to be brought together while the second and third members are clamped together, said first and second members being interconnected by a mechanism by means of which the second member may be moved axially towards and away from the first member, said mechanism comprising a rotary member having relatively eccentric parts which are respectively mounted in the said portion and in the second member, means being provided for rotating the said rotary member, and means, operable after the second and third members have been separated, for effecting relative sliding movement of the said portion in the said aperture to bring the moulding surface on said portion outwardly of said aperture, whereby to assist removal of the moulded article.

References Cited

UNITED STATES PATENTS

| | | | |
|---|---|---|---|
| 1,624,904 | 4/1927 | Claus | 18—16.7X |
| 1,648,721 | 11/1927 | Claus | 18—16.7X |
| 2,336,982 | 12/1943 | Cremer | 18—16.5 |
| 2,395,461 | 2/1946 | Chandler et al. | |
| 2,569,226 | 9/1951 | Carter. | |
| 2,398,227 | 4/1946 | Hubbert | 18—16.5 |
| 2,549,642 | 4/1951 | Seelig. | 18—16.5 |
| 2,810,929 | 10/1957 | Willi | 18—16.7 |
| 2,821,748 | 2/1958 | Willi | 18—16.7 |
| 3,129,463 | 4/1964 | Gill et al. | 18—16.5X |
| 3,132,379 | 5/1964 | Crane | 18—16.5 |
| 3,149,375 | 9/1964 | Gehl | 18—16.5 |
| 3,154,812 | 11/1964 | Haller | 18—16.7 |
| 3,168,759 | 2/1965 | Johannigman | 18—16.7 |

FOREIGN PATENTS 663,040   12/1951   Great Britain.

J. HOWARD FLINT, Jr., Primary Examiner

U.S. Cl. X.R.

18—16.5; 264—325